United States Patent
Moore et al.

(10) Patent No.: US 7,276,264 B1
(45) Date of Patent: Oct. 2, 2007

(54) METHODS FOR COATING CONDUIT INTERIOR SURFACES UTILIZING A THERMAL SPRAY GUN WITH EXTENSION ARM

(75) Inventors: Karen A. Moore, Idaho Falls, ID (US); Raymond A. Zatorski, East Hampton, CT (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/122,164

(22) Filed: May 3, 2005

Related U.S. Application Data

(62) Division of application No. 10/074,355, filed on Feb. 11, 2002, now Pat. No. 6,916,502.

(51) Int. Cl.
  *B05D 7/22* (2006.01)
  *B05D 1/08* (2006.01)
(52) U.S. Cl. .................. 427/236; 427/238; 427/446
(58) Field of Classification Search ........ 427/230–239, 427/105, 123; 118/55, 317, 318, DIG. 10
  See application file for complete search history.

(56) References Cited

U.S. PATENT DOCUMENTS

| | | | |
|---|---|---|---|
| 2,488,195 A * | 11/1949 | Ivey .......................... 239/105 |
| 3,596,269 A | 7/1971 | Laska |
| 3,740,522 A * | 6/1973 | Muehlberger .......... 219/121.47 |
| 3,742,350 A | 6/1973 | White |
| 3,814,616 A * | 6/1974 | Kondo et al. ............... 427/476 |
| 3,826,301 A | 7/1974 | Brooks |
| 3,990,854 A | 11/1976 | Dahmen |
| 4,092,950 A | 6/1978 | Hart |
| 4,313,565 A | 2/1982 | Focant |
| 4,340,010 A | 7/1982 | Hart |
| 4,420,251 A | 12/1983 | James et al. |
| 4,472,621 A | 9/1984 | Blackmore |
| 4,514,443 A | 4/1985 | Kostecki |
| 4,529,974 A | 7/1985 | Tanaka et al. |
| 4,661,682 A | 4/1987 | Gruner et al. |
| 4,677,371 A | 6/1987 | Imaizumi |
| 4,704,985 A * | 11/1987 | Rubinstein .................. 118/316 |
| 4,736,157 A | 4/1988 | Betker et al. |
| 4,774,905 A | 10/1988 | Nobis |
| 4,853,515 A | 8/1989 | Willen et al. |
| 4,926,165 A | 5/1990 | Lahlouh et al. |
| 5,015,958 A | 5/1991 | Masia et al. |
| 5,024,423 A | 6/1991 | Matsumoto et al. |
| 5,167,983 A | 12/1992 | Liu et al. |
| 5,181,962 A | 1/1993 | Hart |
| 5,185,183 A | 2/1993 | Gonda et al. |
| 5,195,046 A | 3/1993 | Gerardi et al. |
| 5,254,820 A | 10/1993 | Pesheck et al. |
| 5,279,148 A | 1/1994 | Brandes |
| 5,369,366 A | 11/1994 | Piesinger |
| 5,394,141 A | 2/1995 | Soulier |
| 5,410,255 A | 4/1995 | Bailey |
| 5,412,173 A | 5/1995 | Muehlberger |
| 5,416,280 A | 5/1995 | McDermott et al. |
| 5,551,484 A | 9/1996 | Charboneau |
| 5,573,814 A * | 11/1996 | Donovan ..................... 427/448 |
| 5,602,492 A | 2/1997 | Cresswell et al. |
| 5,743,299 A | 4/1998 | Chick et al. |
| 5,750,902 A | 5/1998 | Schwiderski |
| 5,785,727 A | 7/1998 | Mine et al. |
| 5,847,286 A | 12/1998 | Klein et al. |
| 5,913,977 A * | 6/1999 | Nichols ....................... 118/712 |
| 5,951,761 A | 9/1999 | Edstrom |
| 6,058,978 A | 5/2000 | Paletta et al. |
| 6,085,413 A | 7/2000 | Klassen et al. |
| 6,194,890 B1 | 2/2001 | Doyle et al. |
| 6,197,168 B1 * | 3/2001 | Matsunaga et al. ..... 204/196.01 |
| 6,210,972 B1 | 4/2001 | Williams et al. |
| 6,316,100 B1 | 11/2001 | Kodas et al. |
| 6,320,400 B1 | 11/2001 | Black et al. |
| 6,362,615 B1 | 3/2002 | Davidson et al. |
| 6,492,898 B1 | 12/2002 | Sabbattini et al. |
| 6,498,568 B1 | 12/2002 | Austin et al. |
| 6,501,278 B1 | 12/2002 | Arabi |
| 6,575,663 B2 | 6/2003 | Kostelnik et al. |
| 6,626,244 B2 | 9/2003 | Powers |
| 6,715,550 B2 | 4/2004 | Vinegar et al. |
| 6,896,446 B2 | 5/2005 | Kostelnik et al. |
| 6,910,829 B2 | 6/2005 | Nickelson et al. |

(Continued)

FOREIGN PATENT DOCUMENTS

| | | |
|---|---|---|
| DE | 3740498 A1 | 6/1989 |
| JP | 58-011057 | 1/1983 |
| JP | 60-18462 B | 5/1985 |
| JP | 2002060923 A | 2/2002 |

OTHER PUBLICATIONS

"Pathways for Enhanced Integrity, Reliability and Deliverability" Sep. 2000, US Department of Energy Office of Fossil Energy and the National Energy Technology Laboratory. Report No. DOE/NETL-2000/1130.

*Primary Examiner*—William Phillip Fletcher, III
(74) *Attorney, Agent, or Firm*—TraskBritt

(57) ABSTRACT

Systems and methods for applying a coating to an interior surface of a conduit. In one embodiment, a spray gun configured to apply a coating is attached to an extension arm which may be inserted into the bore of a pipe. The spray gun may be a thermal spray gun adapted to apply a powder coating. An evacuation system may be used to provide a volume area of reduced air pressure for drawing overspray out of the pipe interior during coating. The extension arm as well as the spray gun may be cooled to maintain a consistent temperature in the system, allowing for more consistent coating.

19 Claims, 5 Drawing Sheets

U.S. PATENT DOCUMENTS

| | | |
|---|---|---|
| 6,916,502 B2 | 7/2005 | Moore et al. |
| 6,988,415 B2 | 1/2006 | Richardson |
| 7,032,459 B2 | 4/2006 | Richardson et al. |
| 2001/0000187 A1 | 4/2001 | Peckham et al. |
| 2001/0027708 A1 | 10/2001 | Stewart et al. |
| 2002/139678 A1 | 10/2002 | Wilson et al. |
| 2003/0047317 A1 | 3/2003 | Powers |
| 2003/0152427 A1 | 8/2003 | Nickelson et al. |
| 2003/0161946 A1 | 8/2003 | Moore et al. |
| 2003/0183015 A1 | 10/2003 | Richardson et al |
| 2003/0190194 A1 | 10/2003 | Kostelnik et al. |
| 2003/0198517 A1 | 10/2003 | Kostelnik et al. |
| 2004/0045365 A1 | 3/2004 | Richardson |
| 2005/0097965 A1 | 5/2005 | Richardson et al. |

* cited by examiner

METHODS FOR COATING CONDUIT INTERIOR SURFACES UTILIZING A THERMAL SPRAY GUN WITH EXTENSION ARM

RELATED APPLICATIONS

The present application is a divisional of U.S. patent application Ser. No. 10/074,355 U.S. Pat. No. 6,916,502 B2, filed on Feb. 11, 2002, which is incorporated herein in its entirety.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

FIELD OF THE INVENTION

The present invention relates to systems and methods for applying coatings to the interior surfaces of conduits, such as pipes and tubes. In particular, the present invention relates to a system for spraying thermally applied coatings on the interior surface of a pipe, while reducing problems occurring with overspray in a confined area.

BACKGROUND OF THE INVENTION

Pipes and pipelines are used to transport a wide variety of fluids, including natural gas, crude oil and refined petroleum products, water, and others. In constructing such pipelines, it is often desirable to apply a coating to the interior surface of the pipe. This allows for the pipe to be constructed from a material selected for strength and durability in the surrounding environment, whether the pipeline is buried or exposed to the elements, while enabling the fluid carried by the pipeline to contact a surface with which it is non-reactive. Coatings may even be selected to create a smoother interior surface and thereby reduce the frictional loss of material passing therethrough. As used herein, the term pipe is understood to refer to any tubular structure, regardless of the cross-sectional shape or length of the structure.

As the demand for resources and transportation thereof from sources to remote usage sites continues to increase, the importance of pipeline and pipeline coatings similarly increases. The need for improved pipe coatings and methods and systems for applying such coatings is well known (See e.g., The Strategic Center for Natural Gas, report Pathways for Enhanced Integrity, Reliability and Deliverability (DOE/NETL-2000/1130, September 2000). Improvements in coating technology could allow pipelines to operate at higher pressures, extend pipeline life and allow for pipeline repair without requiring disassembly.

One conventional method of lining a pipe is to insert a folded pipe liner into a section of pipe, and then unfold the pipe liner against the interior surface of the pipe. An example of such a method is disclosed in U.S. Pat. No. 6,058,978, the disclosure of which is incorporated herein by reference. Such methods require prefabrication of the liner in a material that may be folded and unfolded, in the required length and the ability to fold and insert the liner throughout a pipe.

It is also known to spray a coating on the interior of a pipe by dragging a hose with a radial sprayer, or a pig with a radial sprayer, through the pipe. Examples of such methods are disclosed in U.S. Pat. No. 5,951,761 to Edstrom and U.S. Pat. No. 4,774,905 to Nobis, the disclosure of each of which is incorporated herein by reference. These methods are unable to pinpoint spray towards specific locations in the pipe and do not provide for precise control of the application of the coating spray. Similarly, it is known to mount a sprayer on a cart which moves through the pipe as it radially sprays the interior of a pipe. Examples of such carts and methods are disclosed in U.S. Pat. Nos. 4,092,950, 4,340,010 and 5,181,962 to Hart, the disclosures of each of which are incorporated herein by reference.

Notwithstanding the subject matter of the references described in the preceding paragraphs, a largely unrecognized problem in spray coating interior diameters is overspray of coating material inherent in the process. For example, for alumina or other similar ceramics such as zirconia, the deposition efficiency is only approximately 65%. This means that fully 35% of the material sprayed remains as dust on the interior of the pipe, unconsolidated with the coating and potentially on surfaces not desired to be coated, unless removed. For metals, the deposition efficiency approaches over 80%, meaning that up to 20% of the metal powder sprayed remains as dust in the interior of the pipe, separate from the coating, unless removed. This dust can create problems with the finished coating, as will be further discussed herein. The traditional approach is to attempt to blow the dust away. Experience has shown this is unsuccessful for long runs of interior diameters where thermally sprayed coatings are applied. To remove the amount of overspray generated requires a volume of flush air that is difficult to generate and deliver under sufficient pressure and in an economic manner.

In the aircraft industry, special purpose spray guns, called extension nozzles, are used to apply coatings to certain interior surfaces of parts. Such extension nozzles are limited in length and inflexible over varying lengths of internal regions. Where such extension nozzles have been mounted on poles and extended into an interior space, the supply hoses supplying powder, gas, power and cooling for the gun are quickly coated with a cake of overspray, which can dampen the arc of a plasma gun and prevent subsequent arc initiation. Moisture also condenses on the hoses and pole, causing the overspray powder to more firmly adhere thereto. Pieces of the powder can then fragment off as large particles. The heat inside the interior space will also heat the components of the system, such as the plasma gun, pole and hoses, subtly changing the plasma spray and leading to changes in the coating properties.

Conventional wisdom is that air jets mounted near a spray nozzle can blow away overspray and allow consistent coating to be applied. This approach has proven valid for external surfaces, where temperatures remain lower due to large quantities of ambient air, resulting in a less adherent overspray, and there is sufficient air movement to blow away most of the overspray. Overspray that does adhere to vertical portions of external surfaces is lightly resting on the surface and easily removed by air jets. With spraying to coat interior surfaces however, the bulk of the overspray remains in the interior of the pipe as dust. The overspray is heated due to the confines of the pipe interior which increases undesired adhesion to certain surfaces and there is considerably more overspray per unit area of the interior surface, as compared to an exterior surface. Further, if the pipe is rotating overspray may become ball milled to the surface. Normal air jet flushing is inadequate to remove overspray from the surface.

Overspray then becomes incorporated into the coating, introducing variability in the coating properties.

It would be desirable to provide a system or method for spray coating that reduces the amount of overspray present in the interior of a pipe, as a coating is applied. It would be further desirable for such a system to be configured for selective direction of a spray jet at particular areas of the pipe interior surface. A system that allowed for the thermal spraying of a powder coating in the interior diameter while providing cooling for maintaining optimal operating temperatures would also be desirable.

SUMMARY OF THE INVENTION

The present invention is directed to methods and systems for applying a coating to the internal surface of a conduit. Some embodiments of methods within the present invention include spraying a coating towards a pipe interior surface while providing a volume of reduced air pressure to draw overspray from an interior area of said pipe.

Some embodiments of systems within the scope of the present invention include a spray gun, such as a thermal spray gun, mounted on an extension arm. The thermal spray gun and extension arm may have separate cooling systems and an overspray collector shroud may be disposed to draw any overspray of material sprayed by said spray gun.

DETAILED DESCRIPTION OF THE INVENTION

The present invention provides apparatus, systems and methods for coating internal surfaces of conduits such as pipe and pipelines. It will be appreciated that the examples of apparatus, systems and methods disclosed herein are illustrative only.

Figure 1:
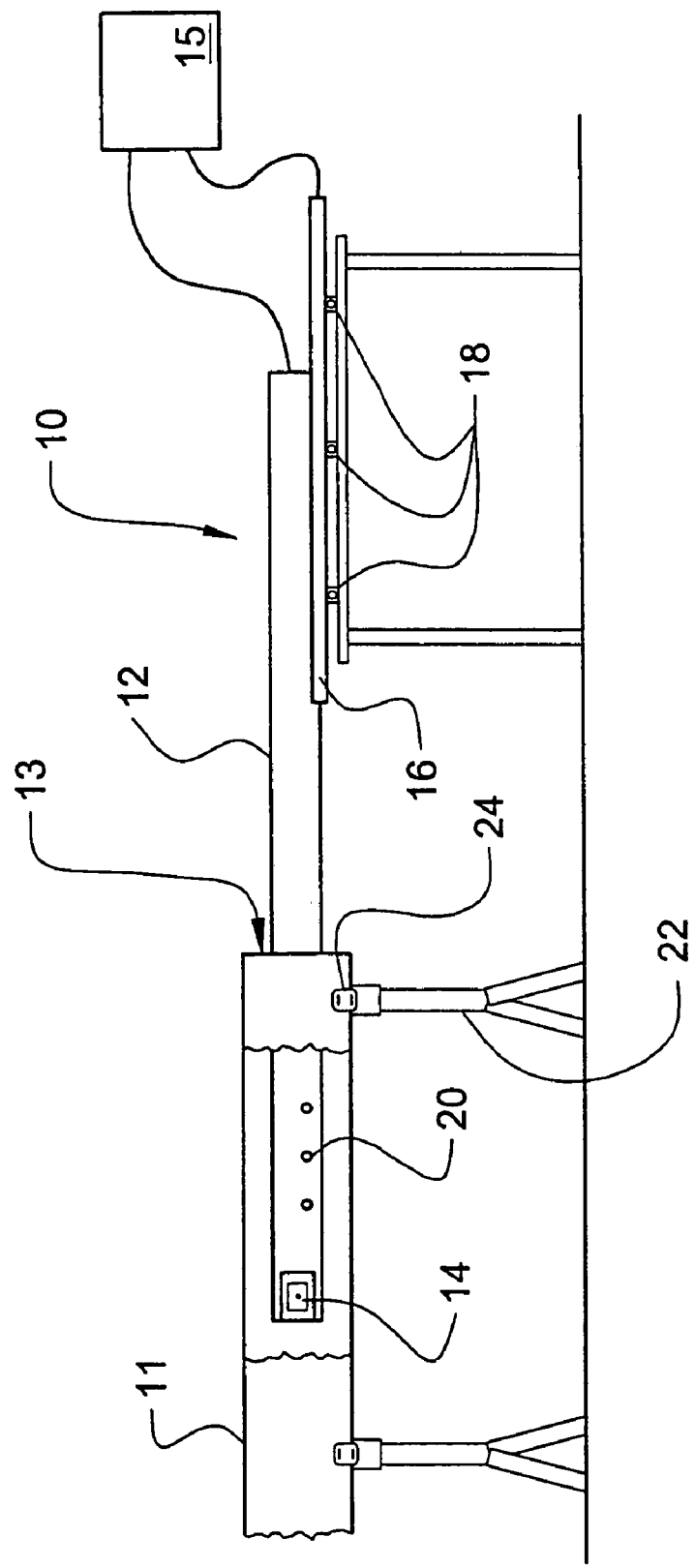
FIG. 1 is a front view of one embodiment of a system for spray coating an interior surface of a pipe, in accordance with the principles of the present invention.
Figure 2:
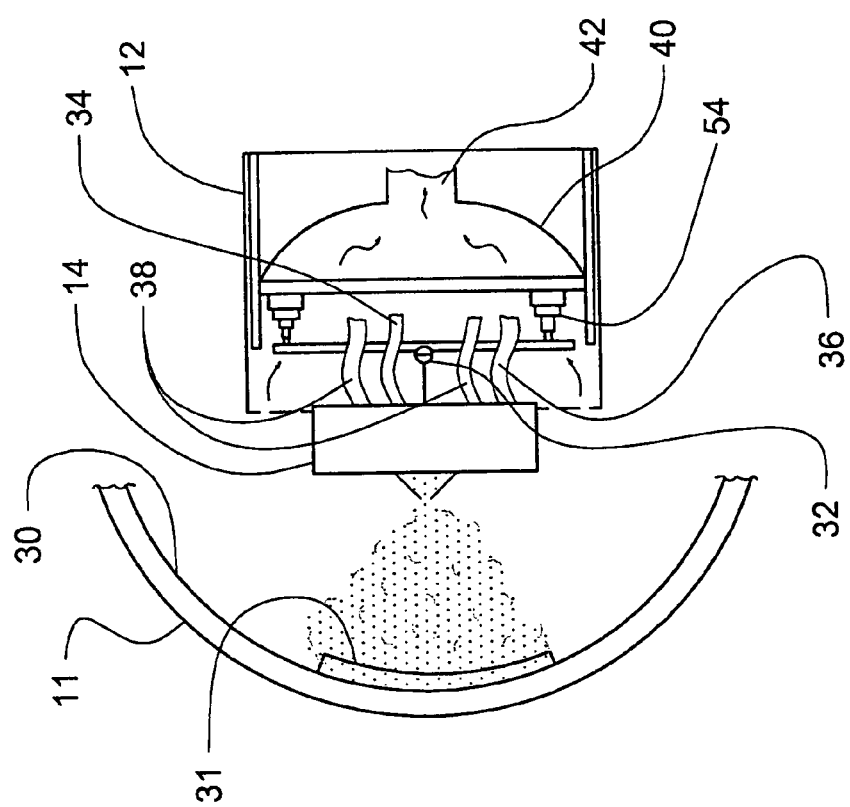
FIG. 2 is a cutaway side view of the spray gun and extension arm of FIG. 1.
Figure 3:
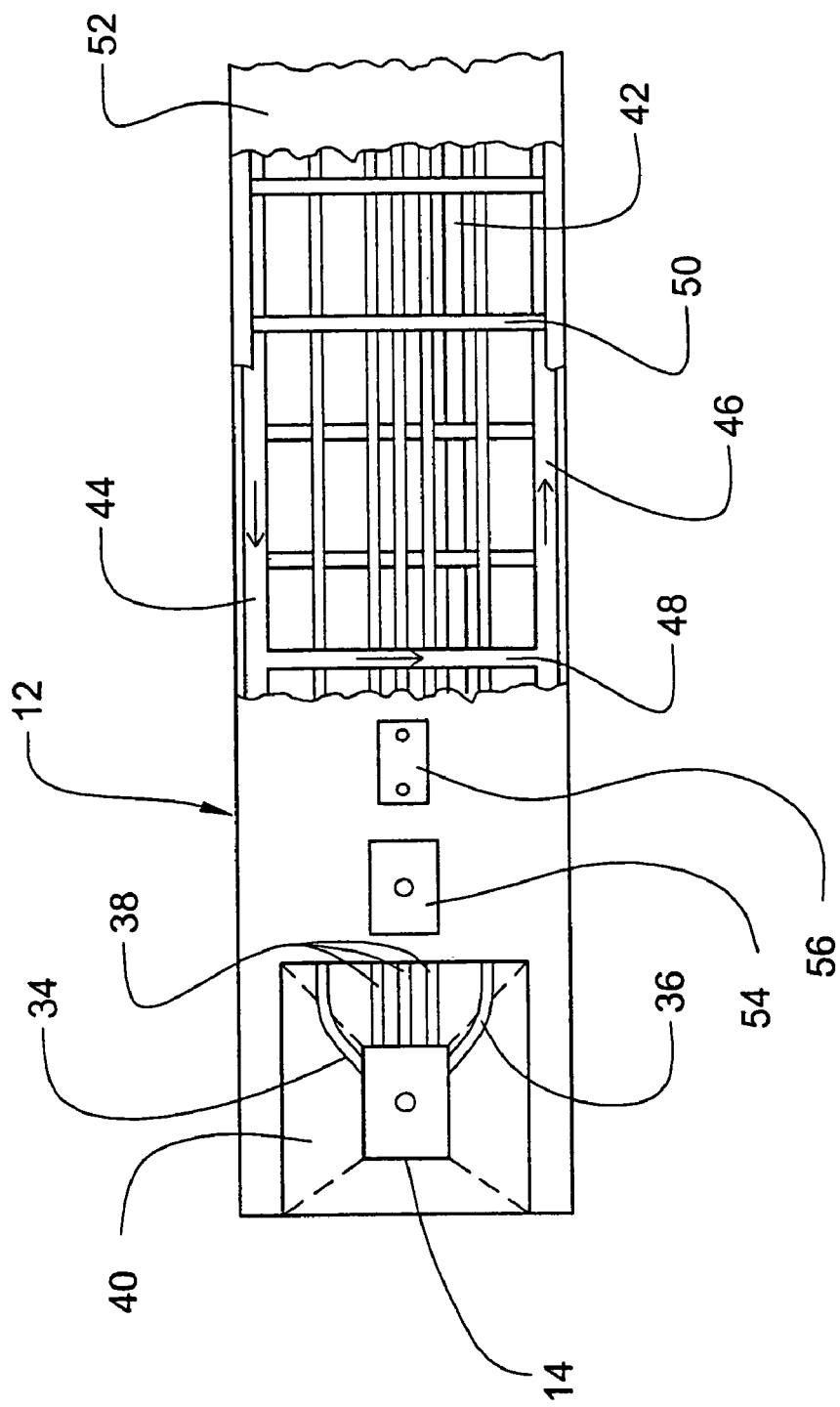
FIG. 3 is a cutaway front view of the spray gun and extension arm of FIG. 1.

With respect to FIGS. 1, 2 and 3 there is depicted a system 10 for coating an interior surface of a pipe 11. A spray gun 14 is attached to an extension arm 12. The extension arm 12 is configured to extend into and out of a section of pipe 12, allowing the spray gun 14 to be used to spray a coating on the interior surface 30 of the pipe 12.

Spray gun 14 may be any spray gun useful for spraying coatings, as known to those skilled in the art. Examples include gas powered and compressed air spray guns, atomizer nozzles for spraying atomized coatings and thermal spray guns for applying thermally bonded coatings, such as powders that are heated to adhere as a layer to a surface, including by complete melting of the powder. Suitable thermal spray guns include plasma spray guns, high velocity oxy fuel spray guns, two wire arc spray guns, single wire arc spray guns, flame spray guns, and any other thermal spray guns known now or in the future to those of ordinary skill in the art. It is currently preferred to use a thermal spray gun to apply a wide variety of coatings, including, but not limited to, metallic powders, ceramic powders, polymer based powders or wire feed of such representative materials.

Extension arm 12 may be extended into and out of the pipe 11 interior through opening 13 using any suitable device or system known to those skilled in the art such as by being mounted on a crawler or pig. One example of such a system is the linear slide track 16 depicted in FIG. 1. The extension arm 12 resides in the linear slide track 16 and may be extended and retracted along its longitudinal axis. Optionally an orthogonal slide track 18 may be used to allow the extension arm 12 to be moved in a direction orthogonal to its longitudinal axis. Other structures for extending and retracting the extension arm 12, or moving the extension arm 12 in an orthogonal direction may be used and are within the scope of the present invention. An elevator, or riser, for raising and lowering the extension arm 12 may also be included. Extension arm 12 may also include one or more outlets 20 to facilitate a cooling air flush in the pipe 11.

Referring to FIGS. 2 and 3, the relationship of the spray gun 14 and the extension arm 12 is shown in more detail. The spray gun 14 may be attached to the extension arm 12 through one or more gimbals 32 which allow the spray gun 14 to be adjusted, moved and rotationally oriented in a number of directions relative to the extension arm 12. This allows the spray gun to be directed during operation, allowing for further control of the coating process. For example, a "blind end" or closed end of a pipe 11 may be coated on the interior surface by directing the spray gun 14 into an appropriate direction, which may be parallel to the long axis of the extension arm 12. Alternatively, the spray gun 14 may be attached to the extension arm with an extendable mount, such as the telescopic mount 54. The extendable mount allows the spray gun 14 to be extended from and retracted back toward the extension arm 12. The extendable mount, in combination with the aforementioned gimbals 32, allows the distance between the spray gun 14 and the interior surface 30 (which, if on a side surface of pipe 11, is typically arcuate) to be closely managed, without the requirement of moving the entire extension arm 12.

The coating system preferably includes an evacuation system for removing overspray from the target site on the interior surface 30 of pipe 11, preferably as the overspray is generated. A volume of reduced air pressure is generated, into which the overspray will flow, away from the interior of the pipe 12. As shown in FIG. 2, an overspray collector shroud 40 is preferably positioned around the spray gun 14. As depicted, the overspray collector shroud 40 is attached to collection line 42, through which collected overspray may be transported through the extension arm 12 and away from the interior of the pipe 11. It will, of course, be appreciated that alternative configurations may be used for an overspray collector shroud 40. The air pressure is reduced in comparison to ambient air pressure within the pipe 11 by the overspray collector shroud 40 in the volume around and to the rear of spray gun 14. This may be accomplished by removing air from this volume at a relatively high rate through the collection line 42.

It is currently preferred to position the reduced pressure volume around and to the rear of the spray gun 14 in order to facilitate the removal of overspray as it is generated during the spray coating process. It will be appreciated that reduced pressure areas may be provided in other locations along the extension arm 12, or on a separate structure, such as on an independent collection arm.

Where spray gun 14 is a thermal spray gun, in addition to the feed lines 38, supplying powder for the coating and gas for powder dispersal and, if required, plasma generation, the spray gun 14 is supplied with a cooling system. The cooling system is configured for circulating a coolant fluid, such as water, through the spray gun 14. Coolant fluid may thus flow from a coolant source remote from the coating head, through a coolant supply line 34 into the spray gun 14 and back out of the system through a coolant return line 36, which may lead back to the coolant source and a heat exchanger for removal of excess heat transferred to the coolant fluid proximate the spray gun 14, or elsewhere as for treatment or disposal. Cooling systems for thermal spray guns are well known in the art and any cooling system may be incorporated in the present invention. The feed lines 38 and coolant supply and return lines 34 and 36 may be contained within a housing of extension arm 12 as set forth in more detail below, sheltering them from overspray during operation. This protective structure may reduce or prevent the "caking" of overspray on these components, reducing the problems associated therewith. Where long lines 34 and 36 are used, due to the length of pipe 11, a booster pump for increasing the pressure or flow of coolant through the cooling system may similarly be housed in the extension arm 12, allowing sufficient flow to be maintained therethough while preventing the caking of overspray thereon.

Extension arm 12 may be supplied with an independent cooling system. This may be accomplished by circulating a coolant fluid, such as water, or by circulating air, carbon dioxide, or similar gasses through the extension arm 12. Coolant fluid may thus flow from a coolant source exterior from the extension arm 12, through a extension arm coolant supply line 44 into one or more extension arm heat exchangers 48 and back out of the extension arm through an extension arm coolant return line 46, which may lead back to the coolant source and a heat exchanger for removal of the excess heat transferred to the coolant fluid proximate the extension arm 12 or elsewhere. The coolant fluid may alternatively be circulated within the arm and exhausted outside the conduit or vented within the conduit to provide additional cooling. The extension arm coolant supply line 44 and extension arm coolant return line 46 may be contained within the extension arm, sheltering them from overspray. As discussed previously herein, the use of a thermal spray gun 14 in an enclosed volume, such as the interior of pipe 11, often raises the ambient temperature in the volume, which can reduce the ability to coat a part with a sprayed coating. The use of an independently cooled extension arm 12 provides a further mechanism for reducing these problems.

Where the extension arm 12 contains feed lines 38 and/or coolant lines 34, 36, 44 or 46 inside, the extension arm 12 may be constructed as a framework 50, covered by a housing 52, as depicted in FIG. 3. The housing 52 serves to protect the components located therein. It will be appreciated that other structures for containing supply lines inside the extension arm 12 may be utilized. For example, a hollow tube may be used as an extension arm 12 and the feed lines 38 and coolant lines 34, 36, 44 or 46 secured to an interior wall thereof.

In some embodiments of the present invention, sensors may be included in the extension arm, allowing the interior surface 30, and any coating thereon, to be inspected. Sensors may include a camera 54, which may be a video camera allowing a portion of the applied coating to be examined. Alternatively, camera 54 may be configured for ultraviolet or other wavelength reception or transmission, in conjunction with an emitter in that or another wavelength. Additional sensors may include a voltmeter 56, or electrical probes, for determining the electrical resistance or the current carrying capacity of a coating by grounding the conduit exterior and measuring current flow across the coating. Other sensors could include ultrasonic or magnetic emitters and/or detectors allowing the distance between the spray gun 14 or extension arm 12 and the interior surface 30 of pipe 11 to be monitored, a thermometer for measuring the temperature of the interior diameter of the pipe 11, and coating thickness monitors for measuring the thickness of the coating 31.

As shown in FIG. 1, one embodiment of the present invention may be used to coat the interior surface 30 of a pipe 11 by insertion of the extension arm 12 into the interior of the pipe 11, allowing spray gun 14 to be operated therein. The pipe 11 may be placed on a support 22, that allows the pipe 11 to be rotated, as by rollers 24 oriented transverse to the longitudinal axis of the pipe 11. The pipe 11 may thus be rotated through a 360° arc, allowing the spray gun 14 to spray a coating on the entire interior surface 30.

Figure 4:
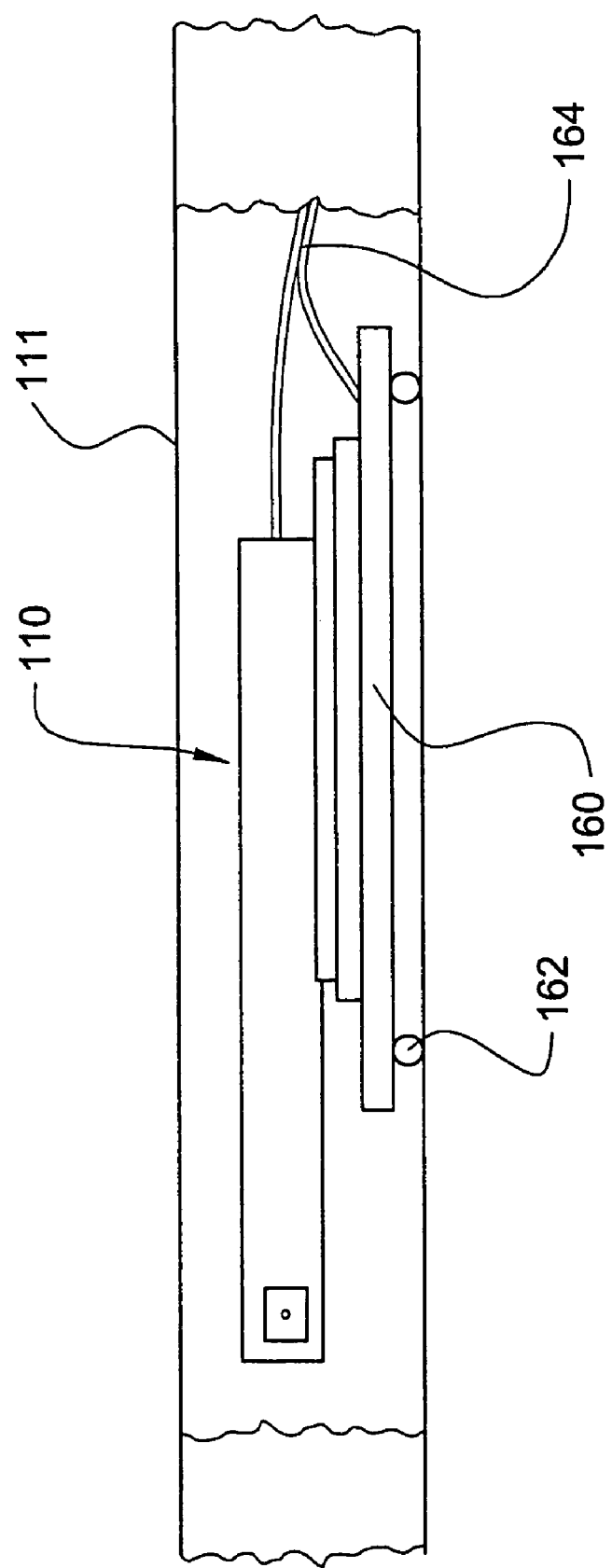
FIG. 4 is a front view of an alternative embodiment of a system for spray coating an interior surface of a pipe.
Figure 5:
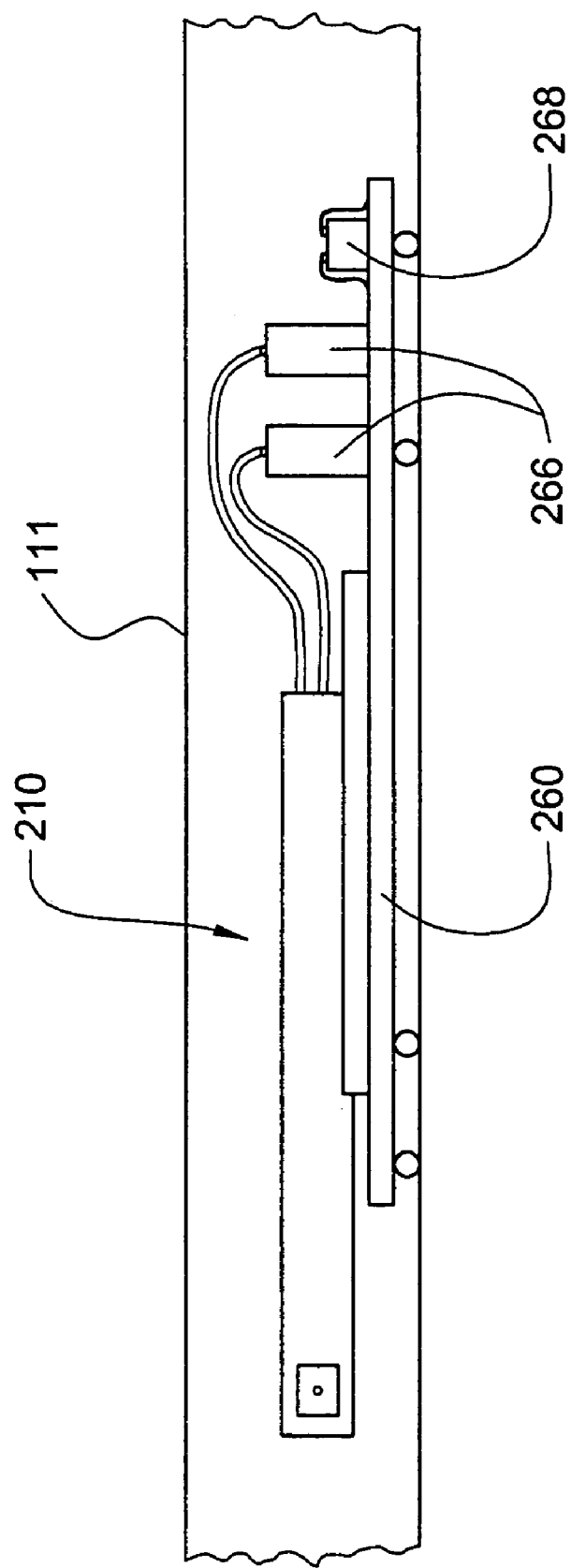
FIG. 5 is a front view of an another alternative embodiment of a system for spray coating an interior surface of a pipe.

FIG. 4 shows an embodiment of a system 110 similar to those of FIGS. 1, 2 and 3 as mounted on a carriage 160. Carriage 160 may be inserted into the bore of an elongated conduit such as a pipeline 111 and moved within the pipeline 111 to apply coating to a desired interior surface portion. The carriage 160 rides on wheels 162 and may include a drive motor, braking system, and any other necessary equipment to allow the system 110 to be moved within pipeline 111. As depicted, a number of lines 164, which may include feed lines for coolant, compressed air or gas, coating material, or electrical, hydraulic and pneumatic lines for power and control, extend from a remote location to the carriage 160. The operation of the carriage 160 and coating system 110 components may be remotely controlled, utilizing a computer, adapted to act as a controller for the system 110, as will be discussed in more detail below. Another embodiment 210 depicted in FIG. 5, includes supply tanks 266 and battery 268 mounted on the carriage 260. This allows the system to be remotely operated while eliminating the need to provide long supply lines.

An embodiment of a system 10, 110 or 210, mounted on a carriage 160 or 260 may be inserted into an existing pipeline 111. Such a system may be used to repair a section of the pipeline 111, as by applying a metal coating inside a section of weakened or damaged pipe 11, providing additional strength, corrosion resistance or both. Such a system may be used to form conductive traces, as will be further discussed herein, on the interior surface 30 of an existing pipeline 111. The ability to apply such coatings in an existing pipeline 111, while reducing the problems caused by overspray desirably may reduce the need to disassemble a section of an existing pipeline 111. Thus, life of the pipeline 11 may be prolonged and the potential savings from reducing a need for disassembly are realized.

It is preferred that the components of a system 10, 110 or 210 designed and fabricated in accordance with the principles of the present invention be controlled in substantially real time. This allows adjustments to be made during the coating application process to provide a more consistent and complete coating 31. A controller 15 in operative communication with the system 10, as depicted in FIG. 1, may be utilized to provide such control. Controller 15 may include a computer, including one or more microprocessors, configured to monitor and control the components of the system 10. The controller 15, may operate in accordance with a set of instructions according to one or more software programs comprising lines of code executed by a microprocessor. It is preferred that operation of all components of the system 10, be substantially simultaneously controlled by the controller 15. It will be appreciated that embodiments of systems similar to those shown at 110 and 210 in FIGS. 4 and 5 and that include a carriage 160 or 260 may similarly include a controller 15 (remote from the carriage 160 or 260), which may also control operation of the carriage 160 or 260.

The controller 15 may thus provide for integrated control over all components of a system 10, 110 or 210 during operation. For example, the power applied to move a carriage 160 or 260, operate the extension arm 12, and rotate or extend spray gun 14 may all be remotely supplied and controlled by the controller 15. Operational aspects of the coating process, such as the flow rate of gases and powder to the spray gun 14, the flow rates of coolant fluid through the cooling systems, initiation of the arc with a plasma spray gun 14 and others may be controlled to produce a uniform coating with desired characteristics. The controller 15 may be programmed to enable a system to automatically apply a uniform coating to a particular pipe's interior diameter. While controlling the application of a uniform coating 31, the spray gun 14 may undergo a predetermined movement longitudinally, laterally, arcuately, circumferentially along the interior of a pipe 11 and otherwise, to achieve a continuous coating on the entire interior surface 30 (or a portion thereof) with uniform thickness, porosity, density, or other characteristics. The movement and operation of the system 10, 110 or 210 may thus be controlled in real time and in three dimensions.

Controller 15 may monitor the coating process using the sensors, as preciously discussed, and either provide feedback to an operator who makes adjustments or automatically adjust the operation to stay within selected coating parameters in response to variations in temperature, fluctuations in coating process parameters, the rate of coating deposition or any other detectable variations in the coating process.

One process that a system 10, 110 or 210 in accordance with the principles of the present invention is especially adapted for is the application of electrically conductive metal traces to the interior of a pipeline 111. The spray gun 14 is inserted into a section of pipe 11, whether attached to an extension arm 12 supported on a stand 22, or by the insertion of a carriage 160 or 260 into a pipeline 111. The spray gun 14 is operated to apply an electrically insulative material as a coating 31 on the interior surface 30. The electrically insulative material may be any suitable material, but it is preferred to use a powdered material, such as alumina or another ceramic material, which can be applied with a thermal spray gun 14. The entire interior surface 30 may be coated with the electrically insulative material, or only a portion thereof as desired.

An electrically conductive material is then applied on top of the electrically insulative material to form a second coating 31 that is electrically conductive in nature. Examples of suitable conductive materials include nickel, nickel alloys, copper, and copper alloys, although it will be appreciated that any desired electrically conductive material may be used. The electrically conductive material is preferably applied in a desired elongated strip to form a conductive trace along the interior surface 30 of the pipe 11. Of course it will be appreciated that, in a pipe 11 constructed of, or already lined with, an insulative material, the conductive layer may be directly applied to the interior surface 30 of the pipe 11. Where desired, a protective layer, of suitable material (such as an additional layer of insulative material) may be applied over the conductive coating 31 to provide protection to the conductive trace. An electric current may be carried along the length of the pipe 11, or pipeline 111, and monitored for changes in resistance or conductivity that may signal changes such as strain or deformation in the pipeline 111. Examples of such traces are disclosed in U.S. patent application Ser. No. 10/074,598, filed on even date herewith, now U.S. Pat. No. 6,889,557, issued May 10, 2005, entitled NETWORK AND TOPOLOGY FOR IDENTIFYING, LOCATING AND QUANTIFYING PHYSICAL PHENOMENA, SYSTEMS AND METHODS FOR EMPLOYING SAME, the disclosure of which is incorporated by reference herein. It will be appreciated that the use of a system 10, 110 or 210 made in accordance with the principles of the present invention may result in better control over the coating 31, improving the consistency of the coating, as discussed herein. Such a consistent coating 31 may enable a pipeline 111 to be monitored and run at an optimal flow rate, under an increased pressure or flow, increasing the efficiency of delivery through the pipeline 111.

During the application of heated materials, as applied by a thermal gun 14, it may be advantageous to further cool the interior of pipe 11 or pipeline 111. This cooling may allow the system 10, 110 or 210 to run continuously for longer periods or allow the consistency of the coating 31 to be better maintained throughout application. In an embodiment of a freestanding system 10, such as that depicted in FIG. 1, a cooling air flush may be directed at the exterior surface of the pipe 11 throughout application by directing fans or other airflow at the exterior surface of the pipe 11. Alternatively, a cooling air flush may be directed into the interior of the pipe 11, either through the opening 13, alongside the extension arm 12, or through outlets 20 in the extension arm 12. It will be appreciated that hoses, nozzles or other components necessary for providing such a cooling air flush may be contained inside the extension arm 12. The cooling air flush may contain an atomized water mist, or other vaporized liquid, allowing the latent heat of evaporation of the water mist to increase the cooling capacity of the flush. Preferably; the cooling mist, also referred to as cooling air, is controlled, either by a closed loop manner or an open loop adjusted manner so that the cooling mist is sufficiently evacuated from the coating area of the workpiece so as to prevent any appreciable amount of condensation of water or other liquid or cooling medium on the coating area or adjacent portions of the conduit or workpiece. More specifically the flow rate of the cooling mist is adjusted with regard to the temperature of the coating area and surrounding portions of the conduit or workpiece. There are a variety of cooling mist generators that are commercially available. Furthermore, one of ordinary skill in the art would be readily capable of constructing an apparatus for generating a cooling mist to optimally cool or flush, the conduit or workpiece when applying a coating in accordance with the present invention.

Accordingly, the present invention includes a method of coating a pipe interior surface. This method may be practiced by spraying a coating towards a pipe interior surface and providing a volume of reduced air pressure to draw any overspray from the interior area of the pipe. It is preferred to spray the coating toward an interior surface by placing a spray gun configured to spray the coating, on an extension arm and inserting the extension arm into the interior area of the pipe. Providing the volume of reduced air pressure may be done by providing a reduced pressure zone around the spray gun. As previously noted, the spray gun used may be a thermal spray gun, such as a plasma spray gun, a high velocity oxy fuel spray gun, a two wire arc spray gun, a single wire arc spray gun, or a flame spray gun. It is preferred to cool a thermal spray gun during operation, and to separately cool the extension arm. The pipe may be cooled by flushing the interior with cooling air that may contain an atomized water mist. Where used, the cooling flush may be directed through an opening in the pipe, or through outlets in the extension arm.

This method may be used to lay down a coating of conductive material. The spray pattern may be designed to allow the coating to serve as a conductive trace. Accordingly, the present invention also includes methods of forming conductive traces on a pipeline interior surface. One embodiment of such a method may be practiced by depositing a conductive layer of a conductive material upon an interior surface of a pipe, where the conductive layer is designed to serve as a conductive trace. Where desired or required, the method may include depositing an insulating layer of an insulating material upon the interior surface of a pipe prior to depositing the conductive layer; and then depositing the conductive layer upon said insulating layer. The insulating layer may be a ceramic material such as alumina or zirconia. The insulating material may be deposited by spraying towards the interior surface, as by placing a spray gun configured to spray the insulating material on an extension arm, inserting the extension arm into the interior area and operating the spray gun. A volume of reduced pressure may be provided adjacent the extension arm to draw any overspray of insulating material from the interior area. Where this is done, it is preferred to locate the volume of reduced pressure around the spray gun. The spray gun may be a thermal spray gun, such as a plasma spray gun, a high velocity oxy fuel spray gun, a two wire arc spray gun, a single wire arc spray gun, or a flame spray gun. Where a thermal spray gun is used it is preferred to cool the thermal spray gun. It is further preferred to cool the extension arm separately from the thermal spray gun.

The conductive material may be any suitable conductive material, including nickel, nickel alloys, copper, and copper alloys. The conductive materials may be applied in the same manner as the insulative materials previously discussed.

When depositing either a conductive or an insulative layer, the pipe may be cooled by flushing the interior with cooling air that may contain a water mist. Where used, the cooling flush may be directed through an opening in the pipe, or through outlets in the extension arm.

It will be appreciated that methods and processes in accordance with the principles of the present invention may be used to lay down coatings 31 of very small thickness, on the order of about 0.001 inches, in a controlled manner without reliance on other air movement to remove heat or particulates from the interior diameter of a pipe 11. Systems 10, 110 or 210 made in accordance with the principles of the present invention may operate in environments of low air exchange and small interior diameters, over long runs.

In a preliminary test of a system made in accordance with the principles of the present invention, an insulative strip of alumina was thermally sprayed onto an interior surface 30 of a square steel tube 38 inches long. The strip was about 0.5 inches wide and about 0.12 to 0.15 inches thick. A conductive nickel-aluminum alloy was then sprayed as a strip over the insulative strip. The resulting conductive strip was formed about 0.3 inches wide and about 0.007 inches thick. Overspray and heat build up were reduced in the interior diameter by the evacuation of overspray via reduced pressure volume and the separate cooling of the spray gun 14 and extension arm 12.

The embodiments and figures provided and described herein do not limit the scope of the present invention. In each of its various embodiments, the system and methods of the present invention provide for coating the interior surface of a pipe or other enclosed area while reducing the problems of overspray associated therewith, and the present invention may be carried out using embodiments different from those specifically described herein. Therefore, the scope of the present invention is not limited by the description provided by the present specification, but is defined by the appended claims.

We claim:

1. A method of coating a pipeline interior surface, comprising:
    inserting a thermal spray gun disposed on an extension arm into an interior area of a pipe;
    thermally spraying matter from the thermal spray gun towards an interior surface of the pipe to form a coating thereon;
    directing cooling air out from the extension arm through at least one outlet in the extension arm directly into a region within the interior area of the pipe and outside the extension arm;
    independently cooling the thermal spray gun and the extension arm; and
    removing air from the interior area of the pipe through a collection line at least partially extending into the interior area of the pipe to draw overspray of the matter from the interior area of the pipe.

2. The method according to claim 1, wherein inserting the spray gun disposed on the extension arm into the interior area of the pipe comprises attaching the spray gun to the extension arm, the spray gun being selectively moveable relative to the extension arm when the spray gun is attached to the extension arm.

3. The method according to claim 1, wherein removing air from the interior area of the pipe through the collection line comprises providing a volume of reduced air pressure adjacent the extension arm.

4. The method according to claim 3, wherein providing the volume of reduced air pressure comprises providing a reduced pressure zone proximate the spray gun.

5. The method according to claim 1, wherein inserting a thermal spray gun comprises inserting a thermal spray gun disposed on an extension arm comprising a hollow tube into an interior area of a pipe, the collection line extending at least partially through the interior of the hollow tube.

6. The method according to claim 1, further comprising cooling the thermal spray gun using a first coolant supply line and cooling the extension arm using a second coolant supply line.

7. The method according to claim 6, further comprising cooling the extension arm using a first cooling system and cooling the thermal spray gun using a second cooling system.

8. The method according to claim 1, further comprising flushing the interior area of the pipe with the cooling air.

9. The method according to claim 1, further comprising directing the cooling air into the interior area of the pipe from a plurality of cooling air outlets disposed on the extension arm.

10. The method according to claim 1, further comprising directing cooling air into the interior area from an opening into the pipe.

11. The method according to claim 1, further comprising adding a water mist to the cooling air.

12. The method according to claim 1, wherein spraying the matter comprises spraying a conductive material.

13. A method of coating a pipeline interior surface, comprising:
- inserting a spray gun disposed on an extension arm into an interior area of a pipe;
- spraying matter from the spray gun towards an interior surface of the pipe to form a coating thereon;
- directing cooling air out from the extension arm through at least one outlet in the extension arm directly into a region within the interior area of the pipe and outside the extension arm; and
- removing air from the interior area of the pipe through a collection line at least partially extending into the interior area of the pipe to draw overspray of the matter from the interior area of the pipe.

14. The method according to claim 1, wherein inserting a thermal spray gun disposed on an extension arm into an interior area of a pipe comprises inserting a carriage into the interior area of the pipe, the carriage carrying the thermal spray gun.

15. The method according to claim 14, further comprising controlling the thermal spray gun from a remote location exterior to the pipe.

16. The method according to claim 15, further comprising inspecting the interior surface of the pipe with at least one sensor.

17. The method according to claim 16, wherein inspecting the interior surface of the pipe comprises inspecting the interior surface of the pipe with at least one of a camera, a voltmeter, and a thermometer.

18. The method according to claim 16, further comprising using a controller to control the thermal spray gun in response to at least one signal received from the at least one sensor.

19. The method according to claim 18, further comprising using a controller to substantially automatically control the thermal spray gun in response to at least one signal received from the at least one sensor.

* * * * *